June 29, 1948. G. H. FREEMAN 2,444,344
INSULATED CONTAINER FOR PERISHABLE PRODUCTS
Filed March 23, 1946
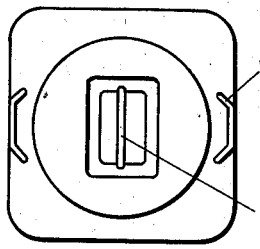
FIG.-2-
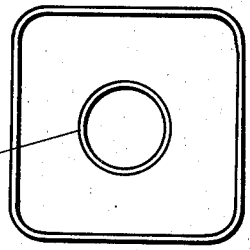
FIG.-3-
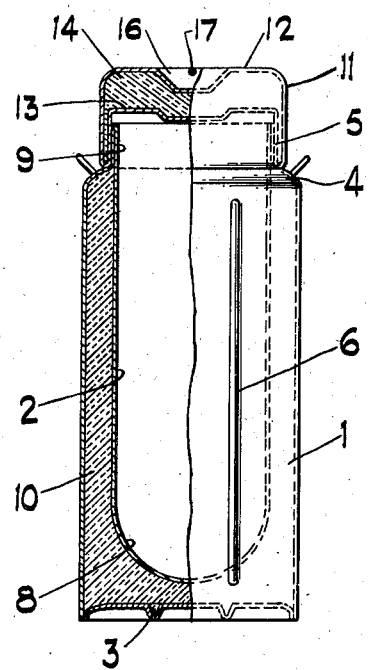
FIG.-1-
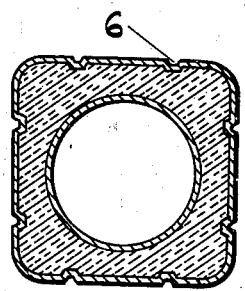
FIG.-4-
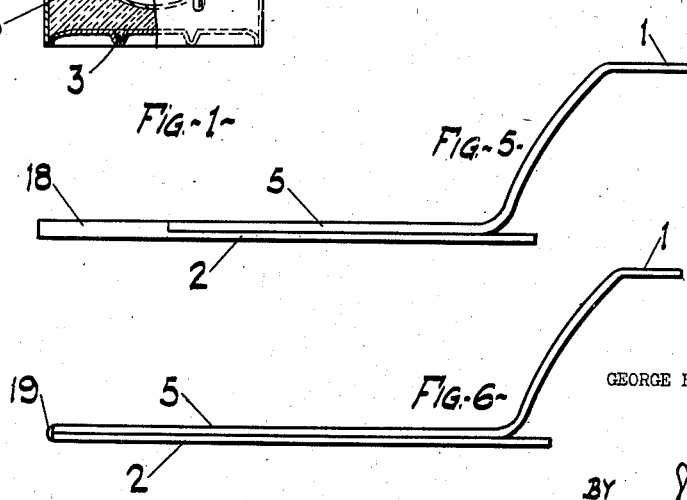
FIG.-5-
FIG.-6-
GEORGE HENRY FREEMAN
INVENTOR.
BY
Attorney Patented June 29, 1948

2,444,344

UNITED STATES PATENT OFFICE 2,444,344

INSULATED CONTAINER FOR PERISHABLE PRODUCTS

George H. Freeman, Toronto, Ontario, Canada

Application March 23, 1946, Serial No. 656,714
In Canada March 15, 1946

1 Claim. (Cl. 220—9)

This invention pertains to containers for perishable products and the like. The invention is more particularly directed to a container of double-walled construction. The space between the walls may be filled with insulating material.

Present containers which are used for milk and other perishable products, have many disadvantages of which it is an object of this invention to overcome. They are usually made of single wall construction which has little insulating value. Furthermore, present containers are usually made with at least one longitudinal and several horizontal seams. These seams are difficult to keep clean, and consequently are a breeding ground for bacteria which will cause spoiling of the milk or cream.

An additional disadvantage of the present dairy container is the fact that there is a large variation between the diameter of the body of the container, and that of the opening or mouth portion through which the container is filled. This difference between the two diameters results in a shoulder portion which usually takes the form of a curve of relatively large radius. This shoulder portion is consequently relatively inaccessible and very difficult to clean.

The container constituting the subject matter of the present invention is formed of two separate shells, assembled in a unitary device. The internal shell functioning as the actual container for the material and surrounded by an outer shell. The two shells are assembled to leave an open space therebetween except at the top portion where the shells are joined together. The space between the two shells may be filled with insulating material.

Another feature of this invention is the construction of the internal shell of the double-walled structure in such a manner that there are no crevices. In addition to being free from crevices, the internal shell is of constant diameter and has straight sidewalls, thus eliminating the shoulder portion usually present in containers of this type.

A further unique feature of this invention is the provision that the exterior shell is rectangular in cross-section. The use of a rectangular section in comparison with a container of circular section helps to conserve shipping space. Furthermore, containers of this invention may be more readily and efficiently stacked either on their sides or vertically. By reason of the rectangular shape the containers may be assembled in a block in abutting relationship with less surface area exposed to either cooling or heating media.

The present invention also contemplates the provision of carrying handles for the containers which do not protrude beyond the exterior periphery of the container and consequently are not easily damaged, and enables the container to lie closely packed either in the upright position or on the side.

The novel features described above, and additional features will be described below and in the accompanying drawings in which:

Figure 1 is a front elevation view partly in sections of the container.

Figure 2 is a top view of the container when closed.

Figure 3 is a bottom view of the container.

Figure 4 is a horizontal cross-section taken through the central portion, of Figure 1.

Figure 5 illustrates the method of joining the inner and outer shells when dissimilar materials are used.

Figure 6 illustrates the method of joining the inner and outer shells when similar metallic materials are used.

By reference to Figure 1, the invention will be described in detail. The container comprises an outer metallic shell shown at 1, and an inner shell either of metal or non-metallic material as shown at 2. The space between the two shells may be filled with insulating material, as described in detail hereafter. The outer shell or container 1, is generally rectangular in shape as shown in Figures 2 and 3, and may be constructed in any conventional manner. This outer shell is closed at the bottom by a bottom sheet which is flanged and has an annular ring 3, pressed in to provide additional stability. The bottom is secured within the lower end of the outer shell in any suitable manner, for example, by welding the outer edge of the flange thereof to the bottom edge of the outer shell. The upper end of the outer shell 1, terminates in a shoulder piece 4, which tapers from the outer shell upwardly and inwardly to a round upstanding collar 5. The outer shell may be strengthened and made more rigid by corrugations or applied ribs, as shown at 6, in Figure 4. Carrying handles 7, are provided to assist in handling the container and are fastened to the shoulder piece 4, in such a manner that they do not project beyond the extremity of the outer container or shell 1.

The inner container or shell 2, is cylindrical in shape with the bottom portion being of generally hemispherical shape as shown at 8. The shell 2, is preferably constructed in a tubular manner with a minimum of seams or crevices. The side walls of the container are straight and terminate at the upper end at 9, where they are joined to the circular upstanding collar 5, of the outer shell 1. The method of joining the two containers, will be described in greater detail hereafter.

The inner shell 2, instead of being cylindrical in shape with a hemispherical bottom, may be rectangular with a flat bottom but having the joint between the side walls and the bottom curved to avoid sharp corners.

The space between the inner and outer shells may be filled with insulating material shown at 10. The insulating material may be fibre glass or any other non-absorbent, odourless, lightweight material. Likewise materials which are friable, would not be satisfactory due to the rough handling which containers of this type receive.

The container is topped by an inverted U-shaped cap shown generally at 11, and consisting of an outer shell 12, and an inner shell 13. The space between the two shells may be filed with insulating material, as in the main body of the container. The insulation material 14, may be of the same type as used in insulating the inner and outer shells of the main container. The inside wall 13, of the top has a depressed portion which may be of any desired shape or as shown at 16. An inset lifting handle is shown at 17. The top fits tightly over the collar 5, and may be easily placed in position or removed, and is not easily knocked off due to the ample bearing contact between the collar and inside of the cap.

The method of joining the inner and outer shells of the container as shown at 9, in Figure 1, is one of the novel features of this invention, and is disclosed in detail in Figures 5 and 6. In Figure 5, the outer shell 1, and the inner shell 2 are formed of dissimilar materials, in this case, the inner shell 2, is of such wall thickness that an extension-like portion 18, extends above and is permanently joined to the collar portion 5. By this form of construction no joints are presented to the milk or other fluid when the same is being poured in or out of the container. The inner wall 2, is in effect hanging upon the collar 5, of the outside shell 1. In Figure 6, the inner shell 2, extends and abuts the collar 5, which is a continuation of the outside shell 1. The two walls are joined together by welding as shown at 19. This form of construction again eliminates any internal seams or crevices which might possibly form collecting points for bacteria in milk.

The method of joining the inner and outer shells as described immediately above in addition to the supporting value of the insulating material 10, is usually sufficient to support adequately the inner shell 2. In cases where additional reinforcement is necessary, non-heat conductive blocks may be placed between the two shells to support adequately the inner shell and its contained material.

The outer shell 1, may be constructed of any suitable material, but it is contemplated that aluminum-magnesium alloys or other light weight, high strength material may be used to effectively reduce the tare weight of the container for shipping purposes. The inner shell 2, must of course be constructed of metal or other noncorrosive materials when used in contact with milk or other dairy products. The straight wall construction of the interior shell of the container of this invention, and the elimination of a taper or collar does away with the difficulty of adequately cleaning the tapered or collared shouldered portion as now experienced and exposes the entire interior to easy inspection.

Dairy products shipped in the container of this invention due to the insulation provided remain fresh for longer periods than like products in the present non-insulated shipping container.

The generally rectangular shape of the external shell 1, makes better use of the area occupied in shipping facilities over that needed by the present container.

The provision of a cap or closure which fits over rather than inside the upstanding collar of the container, is a distinct advantage in that it is nearly impossible to dislodge accidentally the closure.

The provision of handles which do not extend beyond the general outside configuration of the can or container, means less maintenance and repairing of broken lifting handles.

The invention has been illustrated by describing a container having the space between the two walls filled with insulating material. Relatively efficient insulation may also be obtained when the space is filled with air. It is also contemplated that the space between the two shells may be a vacuum or partial vacuum without departing from the scope of the invention.

What I claim is:

A container for perishable products and the like comprising an open-ended inner shell of cylindrical form having a bottom of substantially hemispherical shape, said inner shell being of constant diameter from the open end thereof to the hemispherical bottom, an outer shell having side walls disposed in rectangular relationship, said outer shell having a bottom, the outer edges of which are joined to the bottom edges of the side walls, the upper portions of the side walls tapering inwardly and upwardly and terminating in a ring section which lies in contact with the outer surface of the upper end of the inner shell and cooperates therewith to form a smooth, cylindrical, outer closure-contacting surface, said contact forming the sole contact of the inner shell with the outer shell, said ring section being permanently secured to the upper portion of the inner cylinder, the bottom of the inner shell being spaced from the bottom of the outer shell, a filling of heat insulating material between the inner shell and the side walls and the bottom of the outer shell to reduce transference of heat between said shells, handles attached to said inwardly and upwardly tapering portions, at opposite sides of the container, said handles being wholly inwardly from the side walls of the outer shell, and closure means for said container.

GEORGE H. FREEMAN.

REFERENCES CITED

The following references are of record in the file of this patent:

UNITED STATES PATENTS

| Number | Name | Date |
|---|---|---|
| 668,981 | Covel | Feb. 26, 1901 |
| 992,414 | Fate | May 16, 1911 |
| 1,802,085 | Lonergan et al. | Apr. 21, 1931 |
| 1,867,677 | Nielson | July 19, 1932 |
| 2,186,338 | Mills | Jan. 9, 1940 |
| 2,214,294 | Day | Sept. 10, 1940 |

FOREIGN PATENTS

| Number | Country | Date |
|---|---|---|
| 298,063 | Great Britain | Oct. 4, 1928 |
| 319,821 | Great Britain | Sept. 30, 1929 |